Apr. 10, 1923.

R. L. MORGAN ET AL

MAGNETIC CHUCK

Filed Mar. 5, 1919    2 sheets-sheet 1

1,451,268

Inventors
R. L. Morgan
W. S. Griffith
Edwin Churchill
By Attorney
Geo. H. Kennedy Apr. 10, 1923.

R. L. MORGAN ET AL 1,451,268

MAGNETIC CHUCK

Filed Mar. 5, 1919      2 sheets-sheet 2

Inventors
R. L. Morgan
W. S. Griffith
Edwin Churchill Jr.
By Attorney
Geo. H. Kennedy Patented Apr. 10, 1923.

1,451,268

UNITED STATES PATENT OFFICE.

RALPH L. MORGAN, WINFRED S. GRIFFITH, AND EDWIN CHURCHILL, JR., OF WORCESTER, MASSACHUSETTS, ASSIGNORS, BY MESNE ASSIGNMENTS, TO GREENFIELD TAP AND DIE CORPORATION, OF GREENFIELD, MASSACHUSETTS, A CORPORATION OF MASSACHUSETTS.

MAGNETIC CHUCK.

Application filed March 5, 1919. Serial No. 280,795.

*To all whom it may concern:*

Be it known that we, RALPH L. MORGAN, WINFRED S. GRIFFITH, and EDWIN CHURCHILL, Jr., all citizens of the United States, residing at Worcester, in the county of Worcester and Commonwealth of Massachusetts, have invented a new and useful Improvement in a Magnetic Chuck, of which the following, together with the accompanying drawings, is a specification.

The present invention relates to the construction of a magnetic chuck, the face of which, composed of a plurality of adjacent pole pieces of opposite magnetic polarity, is designed and adapted to support and firmly grip one or more pieces of work while being operated upon. The invention resides in the novel features of construction hereinafter pointed out, whereby the holding power of a chuck of this class is greatly increased, and at the same time, the construction of the device rendered extremely inexpensive and simple. The combination and arrangement of parts which contributes to the above results is fully set forth in the following description, reference being had to the accompanying drawings, in which—

Like reference characters refer to like parts in the different figures.

Figure 1:
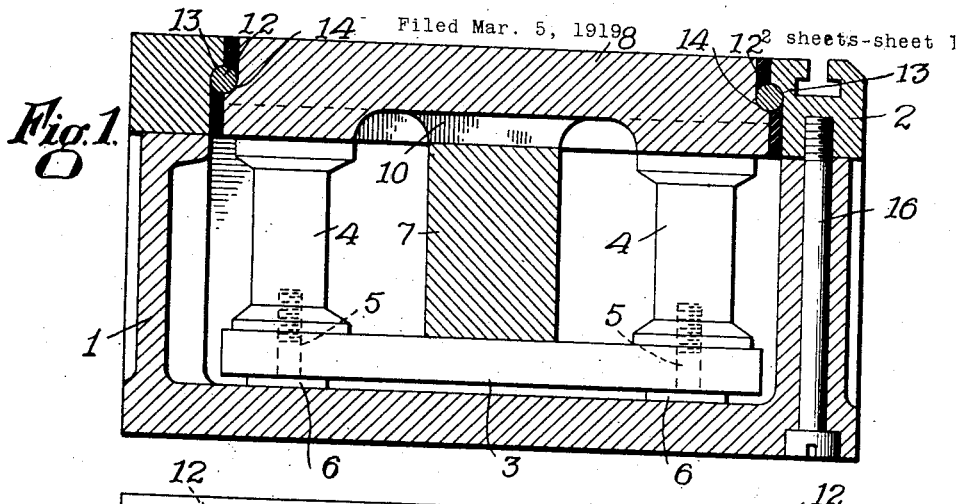
Fig. 1 is a cross sectional view of a magnetic chuck embodying the present invention.
Figure 2:
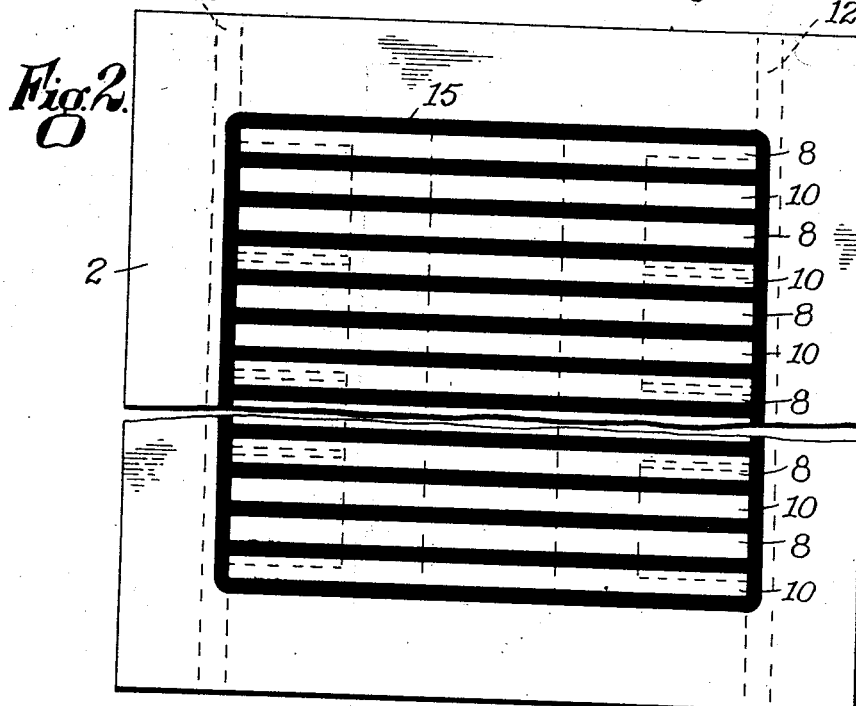
Fig. 2 is a plan view of the chuck shown in Fig. 1.

Referring to Figs. 1 and 2, there is shown a rectangular chuck comprising a body portion or shell 1 which is open at the top, and on which is supported a detachable face plate 2. Said face plate 2 consists of a rectangular framework, corresponding substantially to the side and end walls of the shell 1, with the space inclosed by said framework entirely filled by the several pole pieces of the chuck and their separating layers or strips of non-magnetic material. Said pole pieces are adapted to be energized by their contact with suitably disposed magnetic cores which are supported within and completely inclosed by the shell 1.

To this end, as shown in Fig. 1, there is disposed in the shell 1 a plate or member 3 of suitable magnetic material which supports a plurality of spaced rows of core devices or spools 4, 4. Said spools are maintained in firm magnetic contact with the member 3 in any suitable manner, as by screws or bolts 5, 5 let through the member 3 from the bottom and holding the spools 4, 4 firmly in place. The member 3 is maintained out of magnetic contact with the bottom of shell 1 in any suitable manner, as by the interposition of brass strips or washers 6, 6 between said member 3 and the bottom of shell 1.

In the present instance, two rows of spools 4, 4 are shown, but obviously for chucks of greater width, the number of rows will be increased. Between each of the rows of spools 4, 4 is disposed a bar 7 of magnetic material running lengthwise of the chuck and parallel to said rows, said bar being likewise maintained in magnetic contact with the member 3, and having its top surface substantially flush with the top surfaces of the spools 4, 4. Each of said spools 4, 4 is provided with square or rectangular heads, as shown in Fig. 2, so that when the energizing devices are assembled in the shell 1, the upper ends of each row of spools 4, 4 present a substantially continuous plane surface adapted to give the maximum magnetic contact with the pole pieces of the detachable face plate, as hereinafter described. Each of the spools or core members 4, 4 is wound in the usual manner with a coil of wire, all windings being similar, so that when current is passed through said coils, all of the spools will be magnetized to the same polarity, as for instance positive, and at the same time, due to the magnetic flux in the plate 3 and bar 7, the upper surface of the latter will acquire a negative polarity from the coils on each side thereof.

Figure 3:
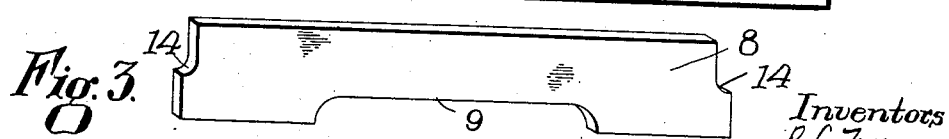
Figs. 3 and 4 are detached perspective views of the two types of pole pieces used in such a chuck.

The construction of a face plate for the chuck shown in Figs. 1 and 2 involves the provision of one set of pole pieces adapted to make magnetic contact with the upper heads of the spools 4, 4 and another set of pole pieces adapted to make magnetic contact with the upper surface of bar 7, which latter is of the opposite magnetic polarity from the upper heads of the spools. To this end, the invention contemplates a plurality of pole pieces, as shown at 8 in Fig. 3, each consisting of a relatively thin strip of suitable magnetic material. The lower edge of each strip 8 is cut away as at 9, so as to bridge the bar 7, and be wholly out of contact therewith when the ends of said strip 8 are in contact with the heads of spools 4, 4.

Figure 4:
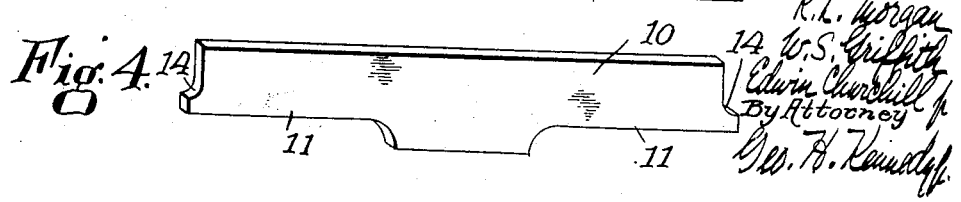

The other set of pole pieces is constituted by a plurality of strips 10, as shown in Fig. 4, which are adapted to make contact at the central portion of their lower edges with the bar 7. Outwardly from said central portion, on both sides, the strips 10 are cut away as shown at 11, 11, so as to be spaced from the heads of the spools 4, 4. The strips 8 and 10 are disposed in alternating relation as shown in Fig. 2, with gaps of non-magnetic material between them, so as to fill entirely the rectangular space of the detachable face plate 2.

The assembly of the face plate is preferably accomplished by the employment of longitudinally extending locking strips or wires 12, 12 of non-magnetic material, such as brass or the like, which wires seat against a curved shoulder 13 formed interiorly of the longitudinal sides of the framework of face plate 2. The pole pieces 8 and 10 are formed at their ends with similar curved shoulders 14, 14, with which the non-magnetic wires 12, 12 make contact. The pole pieces 8 and 10 are set in place within the framework with the latter in inverted position, that is, face downward, so that the wires 12, 12 serve as interlocks between the frame and the pole pieces while the non-magnetic filling material 15 is being poured in the usual manner. This non-magnetic filling material is flowed into all the spaces between adjacent pole pieces, and also between all of said pole pieces and the rectangular framework of the face plate 2, after which the top and bottom surfaces of the completed face plate are machined, or otherwise finished. When completed, the face plate is superposed upon the shell 1, being detachably secured thereto in any suitable manner, as by bolts 16 entered upwardly from the bottom of the shell through the side or end walls thereof. Under all circumstances, the pole pieces 8 will be magnetized to the same polarity as the upper ends of spools 4, namely, as here assumed, positive, while the pole pieces 10 will be magnetized to a negative polarity by the bar 7.

It will be seen that the chuck construction above described lends itself to the provision of a plurality of different face plates, any one of which may be used, as the requirements of the work demand. In other words, with each chuck a number of interchangeable face plates may be provided, some with pole pieces of less thickness than the pole pieces 8 and 10, and some with pole pieces of greater thickness than the pole pieces 8 and 10, all of them, however, being with equal facility energized by the single particular arrangement and disposition of the spools 4, 4 and bar 7 within the shell 1.

Figure 5:
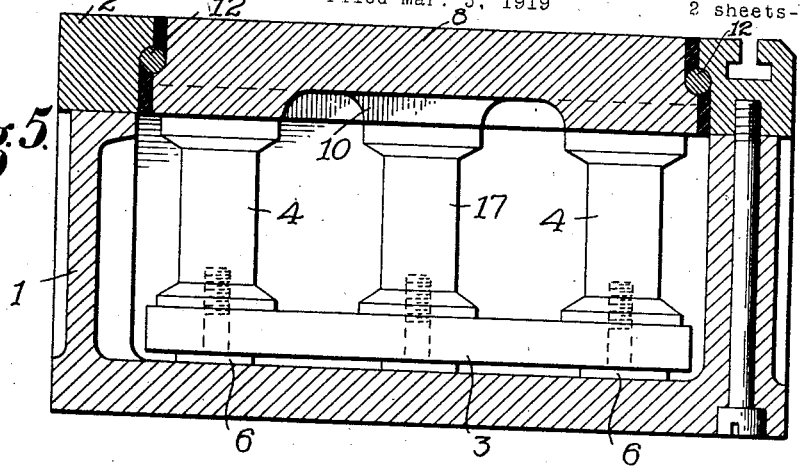
Figs. 5 and 6 are cross sectional views, similar to Fig. 1, of modified forms of construction.
Figure 6:
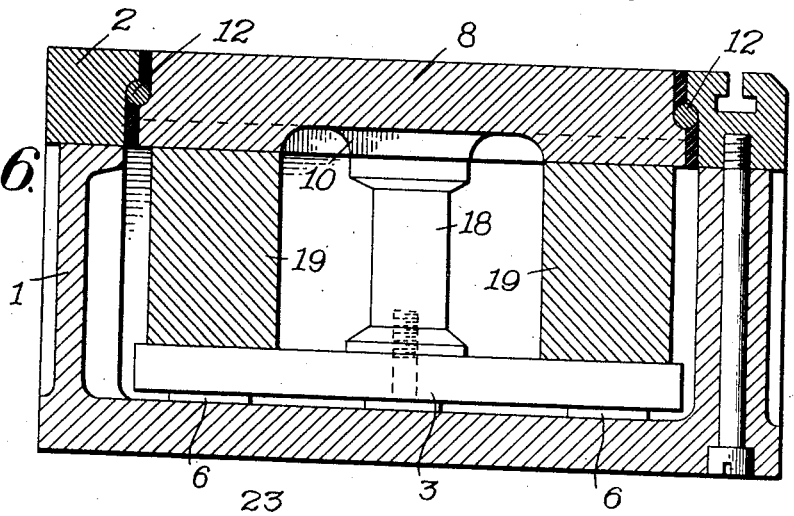

Instead of the bar 7, a row of spools 17 may be provided for energizing the pole pieces 10, as shown in Fig. 5, the spools 17 being so wound as to impart magnetic polarity of the opposite character to that imparted by the spools 4, 4. This variation in construction lends itself particularly to the wider forms of chuck contemplated by the invention, that is, where the pole pieces 8 and 10 are of greater length, and must bridge more than one gap. For narrower chucks, the construction of Fig. 6 becomes feasible, namely where only a single centrally disposed row of spools 18 is necessary, for energizing the pole pieces 10. The opposite magnetic polarity is imparted to the pole pieces 8 by the bars 19, 19 that serve to conduct the magnetic flux from the member 3.

Figure 7:
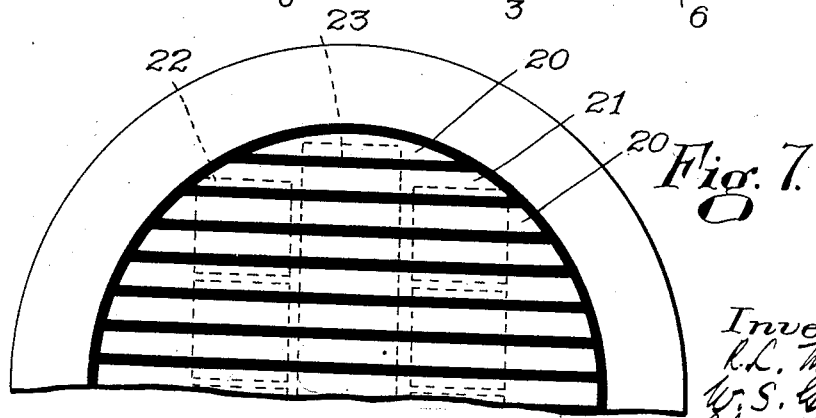
Fig. 7 is a plan view illustrating the application of the invention to a circular chuck.

Fig. 7 shows the adaptation of the invention to a circular chuck, wherein the pole pieces 20 and 21 of opposite magnetic polarity are cut to different lengths, corresponding to the space which they are designed to fill. The lower edges of the pieces 20 are adapted to make contact with the heads of the rows of spools 22, 22, and at the same time to bridge the bars 23, 23 with which the pole pieces 21, 21 make contact. It is obvious that the invention is equally applicable to various other shapes of chuck without departing from the spirit and scope of the appended claims.

We claim,

1. In a magnetic chuck, a work holding face comprising a framework, a plurality of pole pieces disposed within said framework, non-magnetic filling material separating said pole pieces from each other and from said framework, and a locking and spacing member of non-magnetic material embedded in said filling material and interposed between the ends of said pole pieces and said framework, said framework and said pole pieces having opposite shoulders in contact with said member.

2. In a magnetic chuck, a work holding face comprising a framework, a plurality of pole pieces disposed within said framework and separated therefrom and from each other by non-magnetic filling material, and a non-magnetic spacing member embedded in said filling material between the ends of said pole pieces and the adjacent side of said framework, said spacing member being secured in the framework at its ends.

Dated this first day of March, 1919.

RALPH L. MORGAN.
WINFRED S. GRIFFITH.
EDWIN CHURCHILL, Jr.

Witnesses:—
 NELLIE WHALEN,
 PENELOPE COMBERBACH.